United States Patent
Le

(10) Patent No.: US 8,075,232 B2
(45) Date of Patent: Dec. 13, 2011

(54) SYSTEM AND METHOD FOR SECURING CARGO TO A LOAD BEARING SURFACE

(75) Inventor: Tam Le, Santa Ana, CA (US)

(73) Assignee: Sierra Pacific Engineering and Products, Rancho Dominguez, CA (US)

( * ) Notice: Subject to any disclaimer, the term of this patent is extended or adjusted under 35 U.S.C. 154(b) by 275 days.

(21) Appl. No.: 12/387,575

(22) Filed: May 5, 2009

(65) Prior Publication Data
US 2010/0284758 A1   Nov. 11, 2010

(51) Int. Cl.
*B61D 45/00* (2006.01)
(52) U.S. Cl. ....................................................... 410/106
(58) Field of Classification Search .................. 410/102, 410/106–116; 24/265 CD, 115 K; 248/499
See application file for complete search history.

(56) References Cited

U.S. PATENT DOCUMENTS

| 4,907,921 | A |   | 3/1990 | Akright |
| 5,052,869 | A |   | 10/1991 | Hansen, II |
| 6,161,883 | A | * | 12/2000 | Pearl ............................. 294/1.1 |
| 7,086,815 | B2 | * | 8/2006 | Bruns .......................... 410/107 |
| 7,134,819 | B2 |   | 11/2006 | Bulluck |
| 7,201,550 | B2 | * | 4/2007 | Borrmann et al. ............ 410/102 |
| 7,214,015 | B2 | * | 5/2007 | Bruns .......................... 410/102 |
| D624,800 | S | * | 10/2010 | Burns .......................... D8/301 |

* cited by examiner

*Primary Examiner* — Hilary Gutman

(57) ABSTRACT

A tie down for use on a load bearing surface includes a cup-shaped housing, a mounting block, a cylindrical fastener assembly, and at least one bail. The mounting block and cylindrical fastener assembly is rotatably mounted in the cup-shaped housing. The mounting block and cylindrical fastener assembly allow for rotation of the at least one bail above the plane of the load bearing surface.

20 Claims, 3 Drawing Sheets

SYSTEM AND METHOD FOR SECURING CARGO TO A LOAD BEARING SURFACE

STATEMENT REGARDING FEDERALLY FUNDED RESEARCH AND DEVELOPMENT

The invention described in this patent application was not the subject of federally sponsored research and development.

FIELD

The system and method of the present invention relates to securing cargo to a load bearing surface such as found in a trailer, a railroad car, the inside of an airplane or the deck of a ship; more particularly, the system and method of the present invention relates to a tie down usable with a strap, a rope or a chain which is either attached to or passes over cargo to hold the cargo in place against the load bearing surface during transport.

BACKGROUND

The transport of cargo by a vehicle on land, in the air or over water typically requires temporarily securing the cargo to a substantially flat load bearing surface. This temporary securing of cargo to a substantially flat load bearing surface prevents the cargo from moving and effectively prevents the cargo from moving with respect to the vehicle. The process of securing cargo to a substantially flat load bearing surface typically involves the use of the straps, the ropes, the chains and the like. The straps, the ropes, the chains and the like are either attached to the cargo, passed over the cargo or passed around the cargo. Once the straps, the ropes, the chains and the like have been attached to, passed over, or passed around the cargo, the end of the strap, the rope or the chain is caused to be connected to a tie down secured to the load bearing surface. A more detailed description of such tie downs appears in MIL-STD-209K as all branches of the military are heavily involved in moving cargo each time military personnel and their equipment are deployed to various parts of the world.

Various different types of tie downs are currently available. U.S. Pat. Nos. 4,907,921; 5,052,869; and 7,134,819 are representative of prior art tie downs.

Makers and users of tie downs are continually looking for stronger, easier to use, easier to manufacture and less expensive tie downs. Accordingly, a need remains in the art for a tie down which is stronger, easier to use, easier to manufacture and less expensive than prior art tie downs.

SUMMARY

The disclosed tie down is stronger, easier to use, easier to manufacture and less expensive than prior art tie downs.

The disclosed tie down includes a housing. The housing is effectively a shallow cup-shaped housing with a flange formed around its top or upper edge. The flange around the upper edge of the cup-shaped housing includes mounting holes for attaching the tie down to a load bearing surface. In most applications, when the tie down has been installed on a load bearing surface, the top of the tie down is made to be substantially co-planar with the load bearing surface.

A mounting block is contained within the cup-shaped housing. The mounting block is rotatably mounted to the bottom of the cup-shaped housing.

The mounting block is configured to rotatably secure at least one bail within the cup-shaped housing. When the tie down is not in use, the at least one bail lays within the cup-shaped housing to be substantially co-planar with the load bearing surface. When the tie down is in use, a strap, a rope or a chain is passed under the at least one bail causing the at least one bail to rotate with respect to the mounting block to a position above the plane of the load bearing surface.

In the present invention the at least one bail is connected to the mounting block using a pair of cylindrical fasteners. The cylindrical fasteners pass through hollow bosses formed on either end of the at least one bail and then into openings formed on either end of the mounting block.

DESCRIPTION OF THE DRAWING FIGURES

A still better understanding of the system and method of the present invention for securing cargo to a load bearing surface may be had by reference to the drawing figures which are to be read with the following DESCRIPTION OF THE EMBODIMENTS, wherein.

DESCRIPTION OF THE EMBODIMENTS

Figure 1:
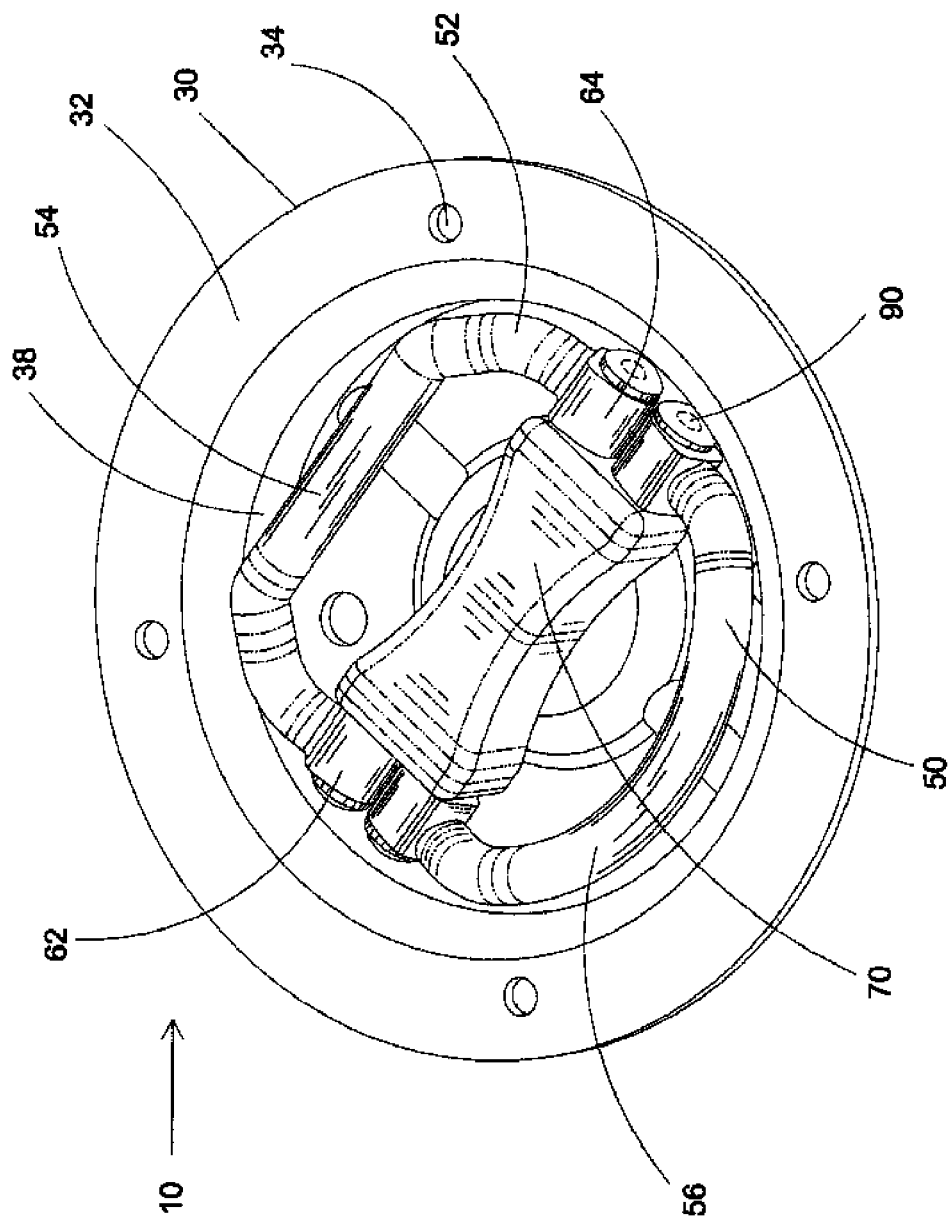
FIG. 1 is a perspective view of the tie down of the disclosed invention.
Figure 2:
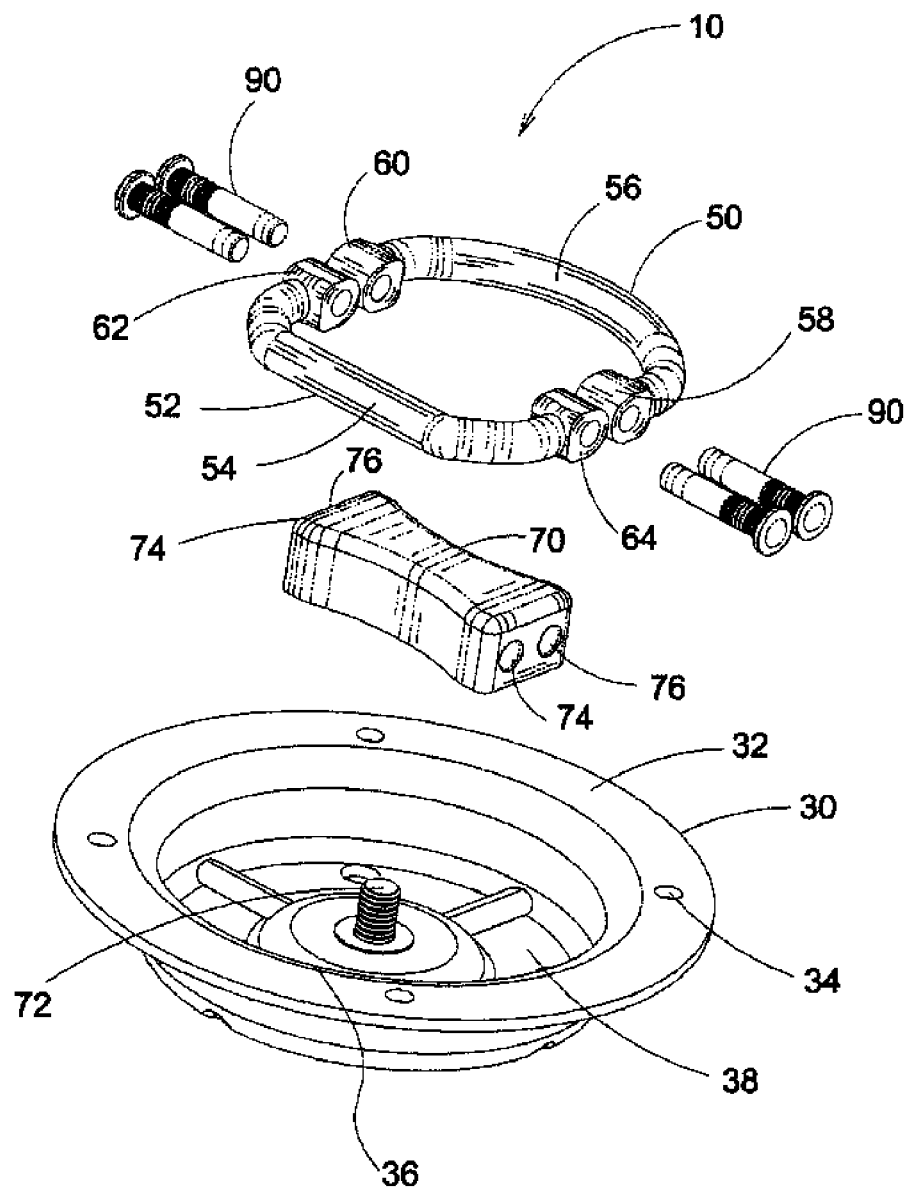
FIG. 2 is a perspective exploded view of the tie down shown in FIG. 1.

As may be seen in FIG. 1 and in FIG. 2 the tie down 10 of the present invention includes three major parts. The first part is the cup-shaped housing. The second part is the at least one bail. And, the third part is the mounting block and cylindrical fasteners which provide a mounting for the at least one bail. In the preferred embodiment, as shown in FIG. 1 and FIG. 2, the tie down 10 includes two bails, one having a substantially flattened portion and the other having a substantially rounded portion. If only one bail is used with the tie down it may be either a bail with a substantially flattened portion or a substantially rounded portion.

Figure 3:
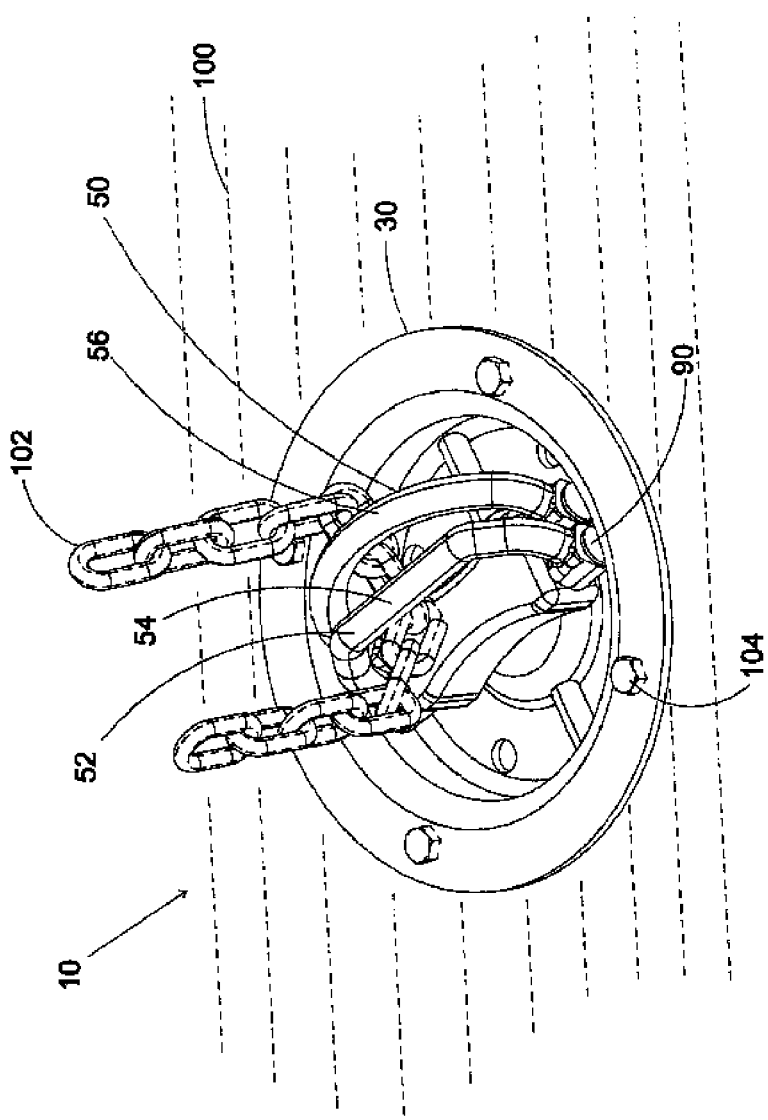
FIG. 3 is a perspective view of a chain passing under the lifted bails of a tie down mounted on a load bearing surface.

As shown in FIG. 3, when mounted to the load bearing surface 100 the complete tie down 10 is made to be substantially planar with the load bearing surface 100. In this position, the user may then pass a strap, a rope or a chain 102 through the bail 50 to secure cargo to the load bearing surface 100. Such use of the tie down 10 will cause the bail or bails engaging the strap, the rope or the chain 102 to rotate upward above the plane of the load bearing surface 100. Following passage of a strap, a rope or a chain 102 through the bail or bails the slack is taken out of the a strap, a rope or a chain 102 and the strap, the rope or the chain 102 is secured so there is little to no movement of the cargo with respect to the load bearing surface 100.

Returning to FIG. 1 and 2, the housing is a cup-shaped housing 30. A flange 32 with holes 34 formed therein surrounds the top or upper edge 36 of the central depressed portion 38 of the cup-shaped housing 30. The holes 34 in the flange 32 are used to mount the cup-shaped housing 30 to the load bearing surface 100. The central depressed portion 38 forms a well within the cup-shaped housing 30. It is within this well that the mounting block 70 and the at least one bail 50 fit to be substantially in the plane of the mounting flange 32. Thus, during the installation process, the depressed portion 38 of the cup-shaped housing 30 will be fit into an opening or a hole formed in the load bearing surface 100. When the depressed portion 38 of the cup-shaped housing 30 is placed into the opening or hole formed in the load bearing surface 100, the tie down 10 may be secured to the load bearing surface 100 by the passage of threaded fasteners 104 or the like through the holes 34 in the flange 32.

While two bails 50, 52 are shown in the preferred embodiment, those of ordinary skill in the art will understand that the tie down 10 may be made with a single bail 50. According to the disclosed preferred embodiment, there is a first bail 50 and a second bail 52. The second bail 52 has a substantially flattened portion 54 having a dimension slightly larger than the widest strap anticipated for use in securing cargo to the load bearing surface 100. The first bail 50 has a substantially rounded portion 56 having a radius of curvature less than the radius of curvature of the inside of the cup-shaped housing 30 so that the first bail 50 may lay flat therein. Formed on either end of the bail 50, are two hollow bosses 58, 60. Similarly on bail 52, two hollow bosses 62, 64 are formed. As will be explained below, the hollow bosses 58, 60, 62, 64 are sized to allow the passage of a cylindrical fastener 90 therethrough.

In the center of the tie down 10 is the mounting block 70. The mounting block 70 is rotatably attached to the bottom of the cup-shaped housing 30 with a fastener 72. In the preferred embodiment a threaded fastener is shown; however a rivet or an unthreaded fastener may also be used.

The mounting block 70 includes at least one pair of holes 74, one in either end. In the preferred embodiment a second of holes 76 is included. If a single bail 50 is used, there is one pair of holes. If two bails 50, 52 are used then there are two pairs of holes as shown in FIG. 2. The function of each hole at the ends of the mounting block 70 is to receive a cylindrical fastener 90 such as a shear pin, a threaded fastener, or a dowel pin. In the preferred embodiment the size of the holes in the mounting block 70 is slightly larger than the size of the cylindrical fasteners 90 so that the cylindrical fasteners 90 may rotate therein. The cylindrical fasteners 90 are then press fit or non-rotatably mounted in the openings in the hollow bosses 58, 60, 62, 64 at the end of each bail 50, 52 respectively so that the cylindrical fasteners 90 rotate together with each bail 50, 52. In an alternate embodiment, the cylindrical fasteners 90 are non-rotatably mounted in the pairs of holes 74, 76 in the mounting block 70 and the openings in the hollow bosses 58, 60, 62, 64 on the end of each bail 50 are larger than the cylindrical fasteners 90 so that each bail may rotate around the cylindrical fasteners 90 which are fixed in position by being non-rotatably mounted in the mounting block 70.

While the present invention has been described in terms of its preferred and alternate embodiments, those of ordinary skill in the art will understand that still other embodiments may be enabled by the disclosure of the system and method for securing cargo to a load bearing surface of the present invention. Such other embodiments shall fall within the scope and meaning of the appended claims.

What is claimed is:

1. A tie-down comprising:
    a housing having an upper edge and substantially central well formed therein;
    a Flange formed around said upper edge;
    at least one bail constructed and arranged for interfitment within said central well of said housing, said at least one bail having a first hollow boss formed on a first end and a second hollow boss formed on a second end;
    a mounting block rotatably affixed to said central well of said housing;
    said mounting block comprising a top surface, a bottom surface, a first side surface, and a second side surface;
    said mounting block including an opening in said first side surface, an opening in said second side surface, and an opening in said bottom surface;
    a first cylindrical fastener sized for passage through said first hollow boss and interfitment within said opening in said first side surface of said mounting block;
    a second cylindrical fastener sized for passage through said second hollow boss and interfitment within said opening in said second side surface of said mounting block; and
    a third fastener sized for passage through said opening in said bottom surface of said mounting block and having an end in said mounting block.

2. The tie-down as defined in claim 1 including a first bail and a second bail.

3. The tie-down as defined in claim 2 wherein said first and second cylindrical fasteners are shear pins.

4. The tie-down as defined in claim 1 wherein said first cylindrical fastener is non-rotatably mounted within said first hollow boss and rotatably mounted within said mounting block, and wherein said second cylindrical fastener is non-rotatably mounted within said second hollow boss and rotatably mounted within said mounting block.

5. The tie-down as defined in claim 1 wherein said first cylindrical fastener is rotatably mounted within said first hollow boss and non-rotatably mounted within said mounting block, and wherein said second cylindrical fastener is rotatably mounted within said second hollow boss and non-rotatably mounted within said mounting block.

6. A tie down assembly for use in a flanged housing mountable to be substantially co-planar with a load bearing surface, said flanged housing having a central well formed therein, said tie down comprising:
    at least one bail constructed and arranged for interfitment within the central well of the flanged housing, said at least one bail having a first hollow boss formed on a first end and a second hollow boss formed on a second end;
    a mounting block rotatably affixed to the central well of the flanged housing;
    said mounting block comprising a top surface, a bottom surface, a first side surface, and a second side surface;
    said mounting block including an opening in said first side surface, an opening in said second side surface, and an opening in said bottom surface;
    a first cylindrical fastener sized for passage through said first hollow boss and interfitment within said opening in said first side surface of said mounting block;
    a second cylindrical fastener sized for passage through said second hollow boss and interfitment within said opening in said second side surface of said mounting block; and
    a third fastener sized for passage through said opening in said bottom surface of said mounting block and having an end in said mounting block.

7. The tie down assembly as defined in claim 6 including a first bail and a second bail.

8. The tie down assembly as defined in claim 7 wherein said first and second cylindrical fasteners are shear pins.

9. The tie down assembly as defined in claim 6 wherein said first cylindrical fastener is non-rotatably mounted within said first hollow boss and rotatably mounted within said mounting block, and wherein said second cylindrical fastener is non-rotatably mounted within said second hollow boss and rotatably mounted within said mounting block.

10. The tie down assembly as defined in claim 6 wherein said first cylindrical fastener is rotatably mounted within said first hollow boss and non-rotatably mounted within said mounting block, and wherein said second cylindrical fastener is rotatably mounted within said second hollow boss and non-rotatably mounted within said mounting block.

11. A method of securing cargo to a load bearing surface with a strap, said method comprising the steps of:

mounting a tie down to be substantially planar with the load bearing surface;
said tie down including:
- a cup having a flange surrounding the upper edge of said cup; said flange constructed and arranged for mounting to the load bearing surface;
- at least one bail sized for interfitment within said cup, said at least one bail having a first hollow boss formed on a first end and a second hollow boss formed on a second end;
- a mounting block rotatably affixed to the bottom of said cup;
- said mounting block comprising a top surface, a bottom surface, a first side surface, and a second side surface;
- said mounting block including an opening in said first side surface, an opening in said second side surface, and an opening in said bottom surface;
- a first cylindrical fastener sized for passage through said first hollow boss and interfitment within said opening in said first side surface of said mounting block;
- a second cylindrical fastener sized for passage through said second hollow boss and interfitment within said opening in said second side surface of said mounting block; and
- a third fastener sized for passage through said opening in said bottom surface of said mounting block and having an end in said mounting block;

passing the strap through said at least one bail;
removing slack from the strap;
securing the strap.

12. The method as defined in claim 11 further including a first bail and a second bail.

13. The method as defined in claim 12 wherein said first bail has a different shape than said second bail.

14. The method as defined in claim 11 wherein said first cylindrical fastener is a shear pin non-rotatably mounted within said first hollow boss and rotatably mounted within said mounting block, and wherein said second cylindrical fastener is a shear pin non-rotatably mounted within said second hollow boss and rotatably mounted within said mounting block.

15. The method as defined in claim 11 wherein said first cylindrical fastener is rotatably mounted within said first hollow boss and non-rotatably mounted within said mounting block, and wherein said second cylindrical fastener is rotatably mounted within said second hollow boss and non-rotatably mounted within said mounting block.

16. A system for securing cargo to a load bearing surface, said system comprising:
- at least one tie down mounted within the load bearing surface;
- at least one strap sized for contact with the load and interfitment with said at least one tie down;
- said at least one tie down further including:
  - a substantially circular housing having a mounting flange surrounding its upper edge and a depressed portion formed substantially in the center thereof;
  - at least one bail sized for interfitment within said depressed portion of said substantially circular housing, said at least one bail having a first hollow boss formed on a first end and a second hollow boss formed on a second end;
  - a mounting block rotatably affixed to said depressed portion of said substantially circular housing;
  - said mounting block comprising a top surface, a bottom surface, a first side surface, and a second side surface;
  - said mounting block including an opening in said first side surface, an opening in said second side surface, and an opening in said bottom surface;
  - a first cylindrical fastener sized for passage through said first hollow boss and interfitment within said opening in said first side surface of said mounting block;
  - a second cylindrical fastener sized for passage through said second hollow boss and interfitment within said opening in said second side surface of said mounting block; and
  - a third fastener sized for passage through said opening in said bottom surface of said mounting block and having an end in said mounting block.

17. The system as defined in claim 16 wherein each of said at least one tie down includes a first bail and a second bail.

18. The system as defined in claim 17 wherein said first bail has a different shape than said second bail.

19. The system as defined in claim 16 wherein said first cylindrical fastener is non-rotatably mounted within said first hollow boss and rotatably mounted within said mounting block, and wherein said second cylindrical fastener is non-rotatably mounted within said second hollow boss and rotatably mounted within said mounting block.

20. The system as defined in claim 16 wherein said first cylindrical fastener is a shear pin rotatably mounted within said first hollow boss and non-rotatably mounted within said mounting block, and wherein said second cylindrical fastener is a shear pin rotatably mounted within said second hollow boss and non-rotatably mounted within said mounting block.

* * * * *